US005745902A

United States Patent [19]

Miller et al.

[11] Patent Number: 5,745,902

[45] Date of Patent: Apr. 28, 1998

[54] METHOD AND SYSTEM FOR ACCESSING A FILE USING FILE NAMES HAVING DIFFERENT FILE NAME FORMATS

[75] Inventors: Thomas J. Miller, Bellevue; Gary D. Kimura, Kirkland, both of Wash.

[73] Assignee: Microsoft Corporation, Redmond, Wash.

[21] Appl. No.: 909,984

[22] Filed: Jul. 6, 1992

[51] Int. Cl.$^6$ .................................................. G06F 17/30
[52] U.S. Cl. ................................................. 707/200; 707/3
[58] Field of Search .................................. 395/600, 700, 395/500, 650, 425; 364/DIG. 1; 707/200, 3

[56] References Cited

U.S. PATENT DOCUMENTS

| | | | |
|---|---|---|---|
| 4,945,475 | 7/1990 | Bruffey et al. | 395/600 |
| 4,945,476 | 7/1990 | Ellioh et al. | 364/DIG. 1 |
| 4,999,766 | 3/1991 | Peters et al. | 395/600 |
| 5,129,088 | 7/1992 | Anslander et al. | 395/700 |
| 5,179,703 | 1/1993 | Evans | 395/700 |
| 5,202,982 | 4/1993 | Grawlich et al. | 395/600 |
| 5,202,983 | 4/1993 | Orita | 395/600 |
| 5,291,595 | 3/1994 | Martius | 395/600 |
| 5,307,494 | 4/1994 | Yasumatsu et al. | 395/600 |
| 5,317,733 | 5/1994 | Murdock | 395/600 |
| 5,359,724 | 10/1994 | Garcia et al. | 395/500 |
| 5,485,606 | 1/1996 | Midgdey et al. | 395/600 |
| 5,537,592 | 7/1996 | King et al. | 395/600 |

OTHER PUBLICATIONS

"A Practical Guide to the Unix System", Mark G. Sobell, System V Release 3 and BSD 4.3, pp. 12–14, 32, 66–69, 82–83 amd 88–89 Dec. 1989.

"Encapsulation of Applications in the NewWave environment", William M. Crow, Hewlett–Packard Journal, v40, n4, p. 57(8) Aug. 1989.

"Using Long Filenames and Extended Attributes, Part 2", Ray Duncan, PC Magazine, v9, n9, p. 305(5) May 1990.

"High–end PC–to–MAC LAN Solutions", Les Freed, PC Magazine, v11, n9, p. 203(8) May 1992.

"Appendix C How Filenames Are Converted," *Microsoft LAN Manager Services for Macintosh Administrator's Guide, Version 1.0, for Microsoft Operating System/2*, Microsoft Corporation, Jun., 1991, pp. 119–123.

Comer, D. et al., "The Tilde File Naming Scheme" *IEEE 6th International Conference on Distributed Computing Systems*, Cambridge, Massachusetts, May 23, 1986, pp. 509–514.

PC Magazine Apr. 24, 1990 (Ziff–Dauts Publishing Co. 1990) Using Long Filenames and Extended Altributes (Part I).

*Primary Examiner*—Paul R. Lintz
*Assistant Examiner*—Hosain T. Alan
*Attorney, Agent, or Firm*—Seed and Berry LLP

[57] ABSTRACT

A multiple file name referencing system stores multiple file names in a file. These multiple file names include an operating system formatted file name and an application formatted file name. When an operating system formatted file name is created or renamed, the multiple file name referencing system automatically generates an application formatted file name having a potentially different format from, but preserving the extension of, the operating system formatted name. The multiple file name referencing system similarly generates an operating system formatted name upon creation or renaming of an application formatted name. A B-tree is provided which contains an operating system entry for the operating system formatted name and an application entry for the application formatted name, each entry containing the address of the same file to which both names refer. The multiple file name referencing system converts the operating system formatted file name to the application formatted file name by accessing the B-tree with reference to the operating system entry, and vice versa. As a result, either file name can be used to directly reference the file without requiring additional file name translation.

24 Claims, 10 Drawing Sheets

METHOD AND SYSTEM FOR ACCESSING A FILE USING FILE NAMES HAVING DIFFERENT FILE NAME FORMATS

TECHNICAL FIELD

The present invention relates to the field of file systems and, more specifically, to a multiple file name referencing system by which a file can be referenced by multiple file names of different formats.

BACKGROUND OF THE INVENTION

Previously, applications implemented on a typical computer system have had to reference file names using the same format as the underlying operating system provides. For example, the DOS operating system (developed by Microsoft Corporation) internally references files with a format that corresponds to an "8.3" formatted file name. That is, DOS would use a file name having a leading name of up to eight characters, such as "myfile" or "filename", followed by a period and an extension of up to three characters, such as "exe" or "kp". Accordingly, applications running on DOS have had to limit file names to this format. Additional constraints well known in the computer field apply to DOS file names, and will be described in more detail in the Detailed Description of the Invention.

In the computer industry, however, it is not uncommon for improvements to be made to an existing operating system, or for all or a portion of an operating system to be replaced so as to provide greater capabilities to users of the operating system. For example, an existing operating system may be revised to allow for files to be names with a more flexible format. It thus becomes possible for applications running on such a revised operating system to reference files using the more flexible format.

When an application is written to run on the revised operating system, the application may access and name files using the more flexible format. However, a number of applications remain available in the industry which were written to run on the previous operating system. As such, these applications impose the same constraints on file names as did the previous operating system. For example, an application designed to run on DOS would limit file names to the "8.3" format described above. As a result of this limitation, the application could not reference files using file names of the more flexible format of the revised operating system. Thus, the application could not refer to files already named with the more flexible format. Nor could the application itself cause new files to be created for which the revised operating system could take advantage of the more flexible format in referencing the files.

SUMMARY OF THE INVENTION

An object of the invention is to provide a method and means for referencing the same file via multiple file names of varying file name format.

This object and other objects of the invention can be obtained by a multiple file name referencing system described as follows. The multiple file name referencing system is provided within the file system of the revised operating system and stores, as necessary, multiple file names in a file. These multiple file names include an "application formatted" file name which is formatted for applications written to run on a different operating system, and an "operating system formatted" file name which is formatted to run on the revised operating system. When an operating system creates or renames a file having an operating system formatted file name, the multiple file name referencing system automatically generates an application formatted file name of a different format from the operating system formatted name. Similarly, the multiple file name referencing system automatically generates an operating system formatted name upon user creation or renaming of an application formatted name.

The multiple file name referencing system maintains in a B-tree an operating system entry containing the operating system formatted name and an application entry containing the application formatted name. Each entry also contains the address of the same file to which both names refer. The multiple file name referencing system converts the operating system formatted file name to the application formatted file name by accessing the B-tree with reference to the operating system entry. Similarly, the multiple file name referencing system converts the application formatted file name to the operating system formatted file name by accessing the B-tree with reference to the application entry. As a result, either file name can be used to directly reference the file without requiring additional file name translation.

DETAILED DESCRIPTION OF THE INVENTION

Figure 1:
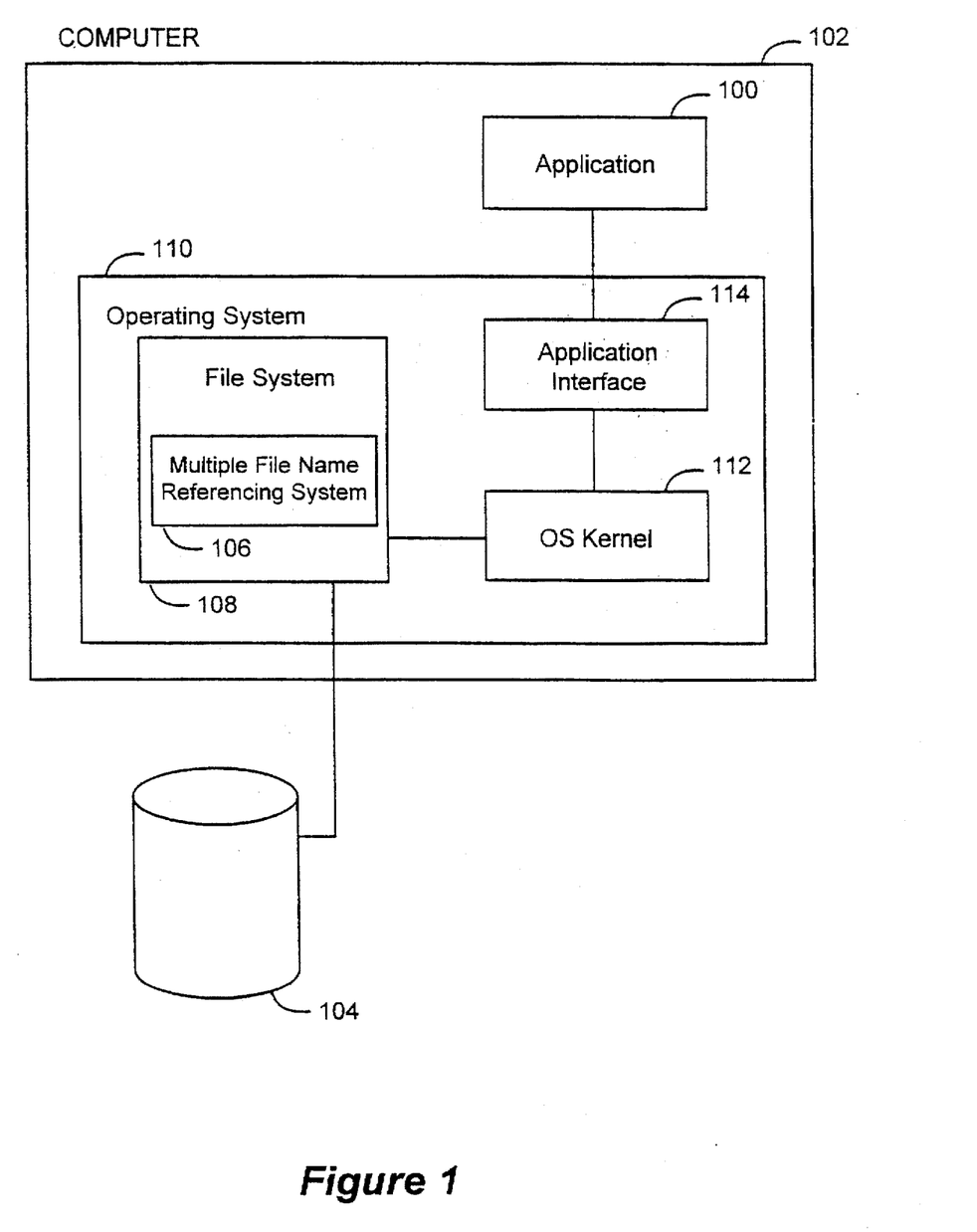
FIG. 1 is a general block diagram of a computer system including a multiple file name referencing system in accordance with the present invention.

FIG. 1 is a general block diagram of a computer system including the multiple file name referencing system of the present invention. In FIG. 1, an application 100 is provided within a computer 102 which accesses and stores various files on a peripheral device 104, such as a disk. In a preferred embodiment of the present invention, the application 100 is a DOS-based application referencing files using a "8.3" format. One of ordinary skill in the art would appreciate, however, that other types of applications using different formats could be accommodated by the generation and conversion process of the present invention. Also in the preferred embodiment, the application 100 is shown provided within the computer 102, as shown. Alternatively, the application 100 could be provided externally to the computer 102 and connected via a network.

Within the computer 102, a multiple file name referencing system 106 is provided to implement the method and system of the present invention, as will be described presently in greater detail. The multiple file name referencing system 106 is provided within a file system 108 in an operating system 110. The operating system 110 has been revised from a DOS operating system using the "8.3" format (hereinafter called "short names"), to reference operating system formatted file names of a more flexible format. This more flexible format provides for names (hereinafter called "long names") that can be up to 255 characters, and can have multiple extensions, spaces and characters considered illegal in DOS "8.3" format.

The application 100, however, was written for the previous DOS operating system which used short names and, as a result, must still refer to files using the restrictive short-name format. As a result of the revision to the operating system, the long names accessible to the operating system 110 thus differ in format from the short names which the application 100 must use.

Ordinarily under these circumstances, the application 100 would have to communicate with the operating system 110 using a short name, and could not access a more flexibly formatted file name (long name). Further, the operating system 110 could not use a long name of the more flexible format when communicating with the application 100. As will be explained, however, the present invention provides via the multiple file name referencing system 106 a method and means for referencing the same file using either the operating system formatted name (long name) or application formatted name (short name).

As will be described presently in greater detail, the multiple file name referencing system 106 serves as a generating means for generating, upon creation or renaming of a file by the application or operating system, a file name having a format different from the format of the newly provided file name. This generated file name, though having a different format, refers to the same file as the newly created file name, and preferably preserves the file extension of the newly created file name to the extent possible.

The multiple file name referencing system 106 also serves as a storing means for storing on a storage such as the disk 104, separate entries in a B-tree for file names having a different format. For example, a long name entry can be provided for a long name and a short name, both of which refer to the same file.

Additionally, the multiple file name referencing system 106 serves as a converting means for converting a file name having one format to the corresponding file name of a different format. The file name referencing system 106 also serves as a file name storing means for storing the differently formatted file names in the same file.

Figure 2:
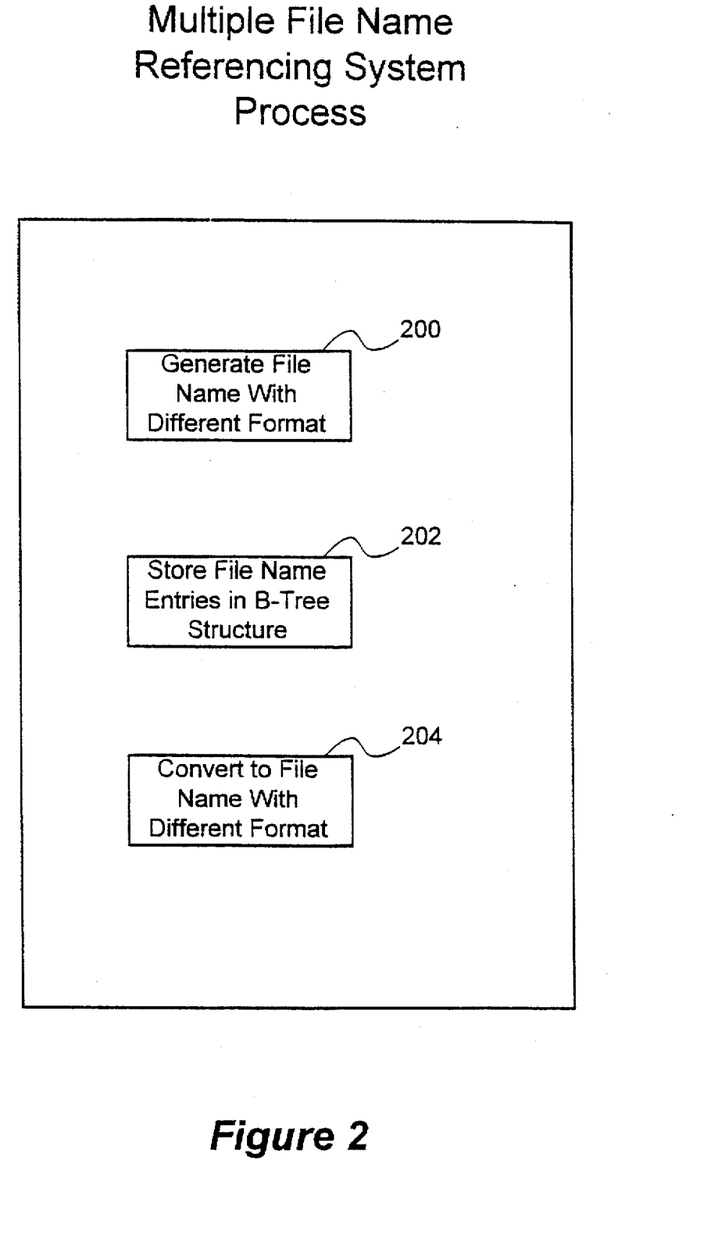
FIG. 2 is a general flow diagram of the process performed by the multiple file name referencing system of the present invention.

FIG. 2 is a general flow diagram of the overall process performed by the multiple file name referencing system of the present invention. The process described in FIG. 2 can be performed, for example, by the multiple file name referencing system 106. In block 200, the file name referencing system generates, upon user creation of a file name of one format, a file name of a different format. If, for example, an operating system formatted name is created, the multiple file name referencing system generates an application formatted name. Similarly, if an application formatted name is created, the multiple file name referencing system generates an operating system formatted name.

In block 202, the file name referencing system stores in a B-tree an operating system entry with the operating system formatted name and an application entry with the application formatted name. In the preferred embodiment of the invention, the operating system entry is a "long name" entry storing a long name as described above, and the application entry is a "short name" entry storing a short name of "8.3" format. In block 204, the multiple file name referencing system converts a file name having one format to the corresponding file name in the different format by accessing the B-tree. For example, a long name is converted to the corresponding short name by accessing the B-tree with reference to the long name. Alternatively, a short name can be converted to the corresponding long name by accessing the B-tree with reference to the short name.

B-TREE STORAGE AND CONVERSION

Figure 8:
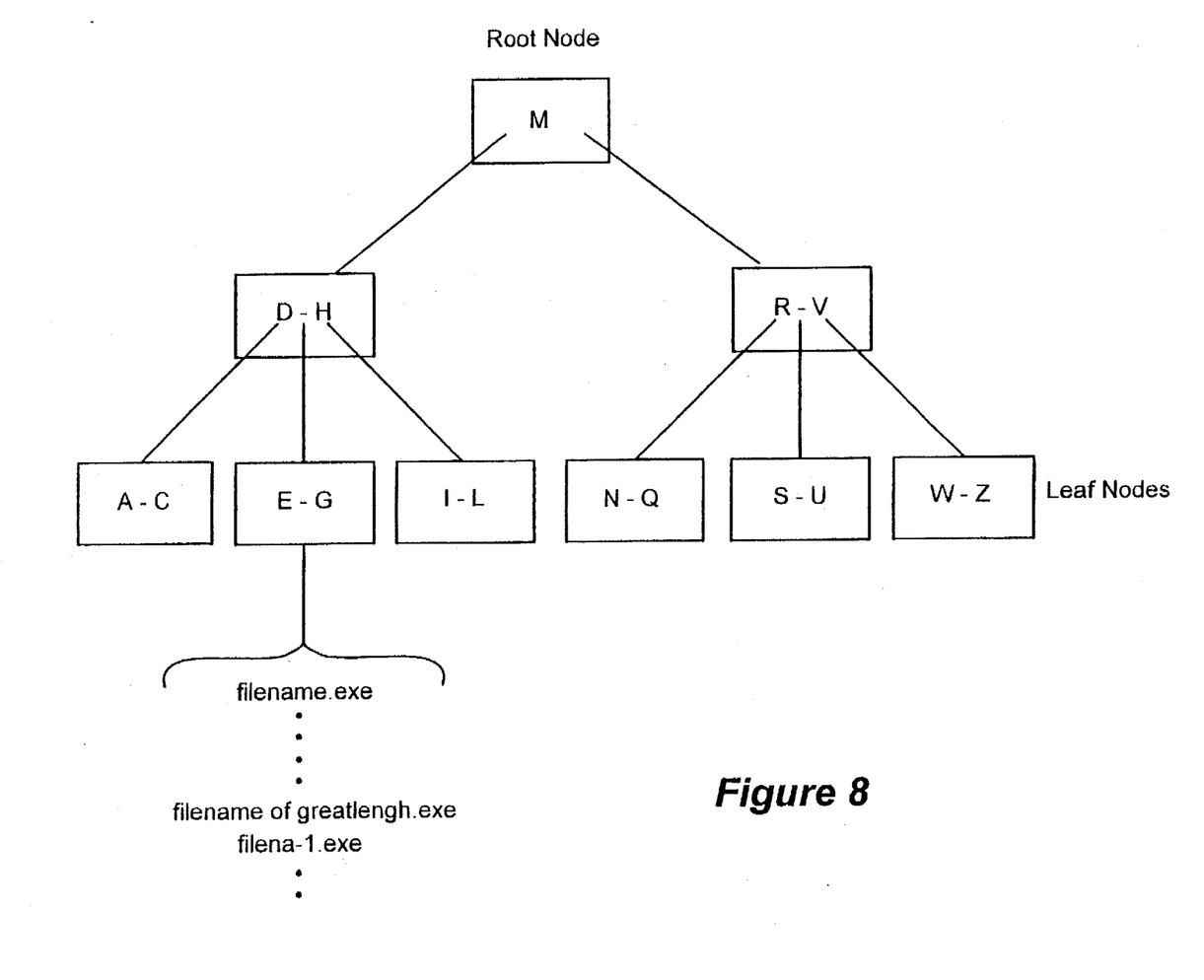
FIG. 8 is a diagram of the B-tree structure in which file system entries and application entries are stored by the multiple file name referencing system of the present invention.

FIG. 8 is a diagram of a B-tree structure in which the application entry (short name) and corresponding operating system entry (long name) are stored by the multiple file name referencing system in block 202 shown in FIG. 2. The use of B-trees is well-known in the computer field. A detailed description of B-trees can be found in Chapter 19 of "Introduction to Algorithms", by Cormen, Leiserson and Rivest, 1990, MIT Press, pp. 381–399.

As shown in FIG. 8, a B-tree is used to maintain the entries for differently formatted file names that have been generated in step 200. As is well known to one of ordinary skill in the computer field, a B-tree is a balanced search tree data structure in which data is organized in accordance with its position with reference to keys in the structure. For example, in an alphabetically arranged B-tree structure as shown in FIG. 8, the letters M, D, H, etc. are keys. That is, data is divided first based on its alphabetical relationship to the letter M, then based on that to D, H, etc.

In the B-tree structure in FIG. 8, file names are divided alphabetically, and thus a file name beginning with the letter "F" would be stored in the "EG" node, or in a node provided thereunder. Thus, in the present invention, if a file having the long name "filenameofgreatlength.exe" is created via the operating system 110, the multiple file name referencing system stores "filenameofgreatlength.exe" in a long name entry in the "EG" node in the B-tree.

In accordance with the present invention, when the file having the long name "filenameofgreatlength.exe" is created, a corresponding short name is automatically generated, as will be explained presently in greater detail. When the application running is a DOS application, such that the application uses file names of an "8.3" format, an "8.3" formatted short name would be generated.

For example, creation of "filenameofgreatlength.exe" would cause the multiple file name referencing system to generate a short name such as "filename.exe". If the file name "filename.exe" is already present in the B-tree, this conflict is resolved by modifying the newly generated name until it is unique, such as to "filena-1.exe". The unique, application formatted file name is then stored in an application entry in the B-tree.

Figure 9:
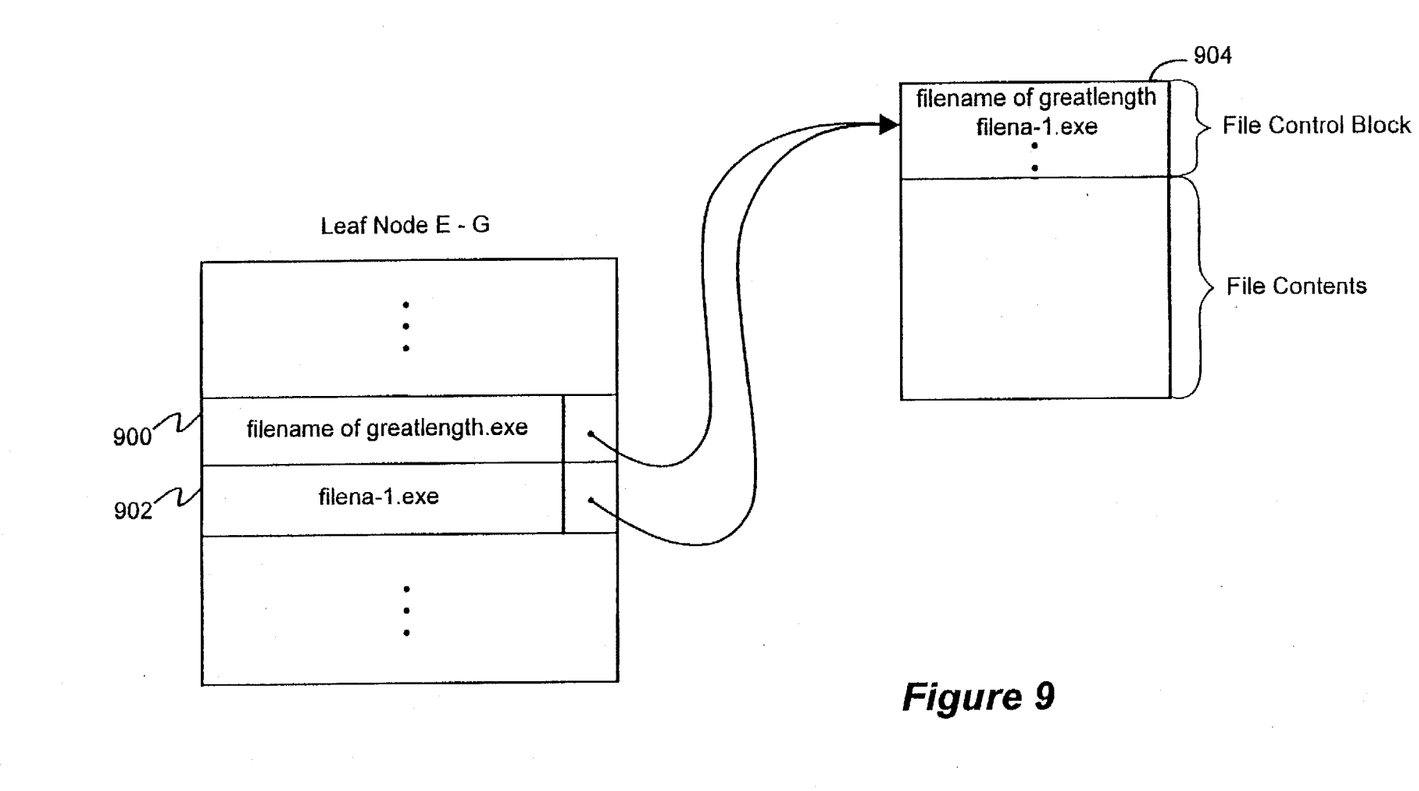
FIG. 9 is an illustration of an application entry and an operating system entry both pointing to the same file.

As shown in FIG. 9, both the operating system entry 900 and application entry 902 point to the same file 904. As a result, either short name "filena-1.exe" or long name "filenameofgreatlength.exe" can be referenced to access the same file 404. Additionally, the File Control Block in the File 904 contains both the long and short names. By storing both filenames in the File Control Block, the multiple file name referencing system allows for accessing the file through one type of formatted filename and determining the other type of formatted file name.

The multiple file name referencing system of the present invention takes advantage of the B-tree structure, such as the one described in FIG. 8, to convert a file name of one format to a corresponding file name of another format, as described in block 204 in FIG. 2. The multiple file name referencing system uses the known file name as a basis for searching the B-tree, comparing the known file name to the keys about which the B-tree is divided.

Figure 10:
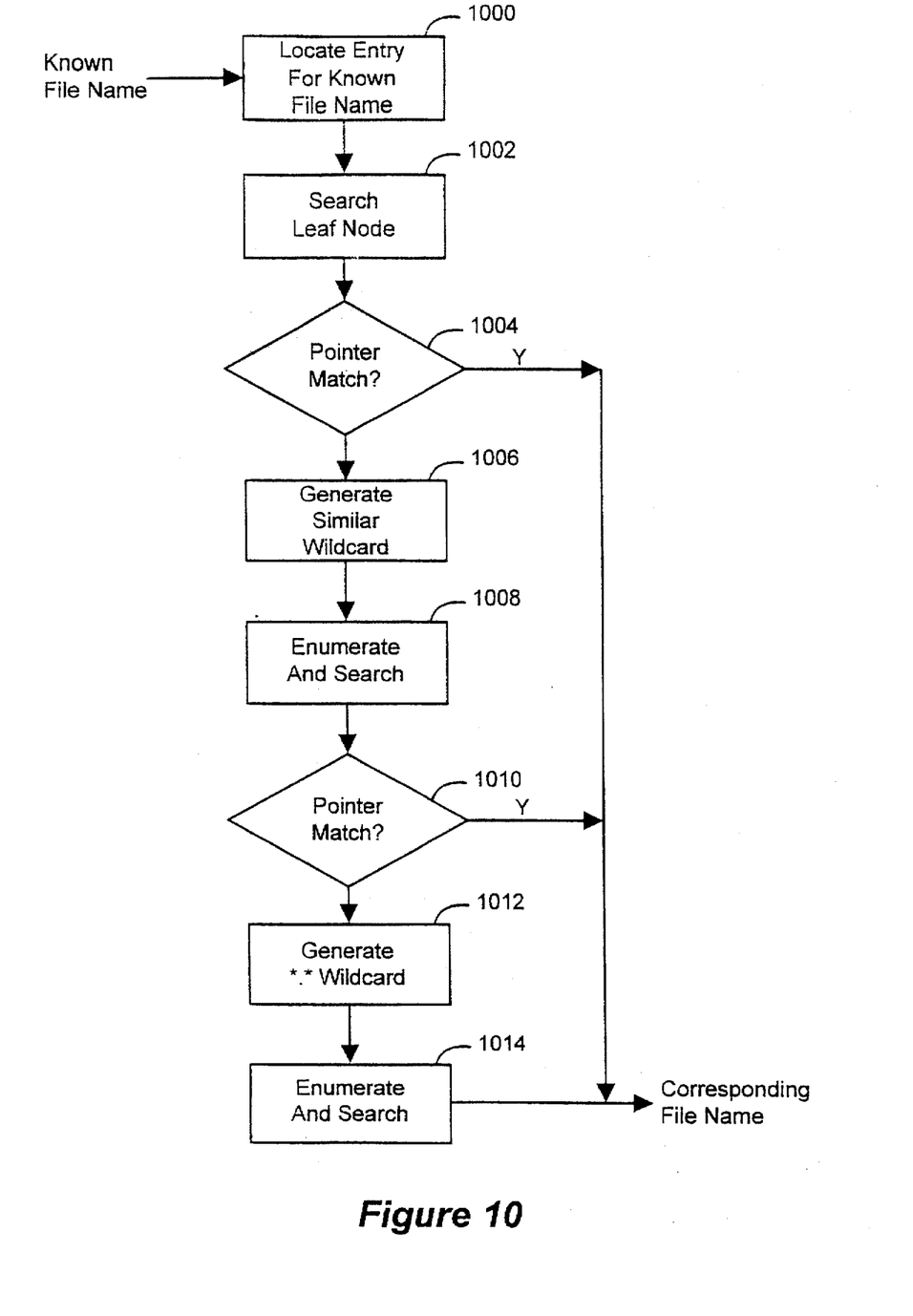
FIG. 10 is a flow diagram of the conversion process performed by the present invention.

The B-tree search to convert the known file name to the corresponding file name (long name to short name, or vice versa) is described with reference in FIG. 10. In step 1000, the file name entry for the known file name is located in the B-tree by alphabetically searching the B-tree for that name. Then, in step 1002, the leaf node containing the known file name is accessed to locate the corresponding file name. If the corresponding entry with a matching file pointer is found in step 1004, then the conversion process ends and the corresponding file name is returned.

In most cases, because of alphabetic similarity, the short name entry is located in the same leaf node as the long name entry for the same file, as shown in FIG. 8. Usually, the known file name entry resides adjacent to the unknown file entry, and thus the known file name can be converted to the unknown file name by checking the adjacent entries for a file pointer that matches the file pointer of the known file name entry. When the long file name entry and short file name entry are not located adjacent to each other, then the long name entry can likely be converted to the application entry, and vice versa, by searching the entire leaf node in which the known file name entry resides.

If the entry for the corresponding name is not located in the same leaf node, then the multiple file name referencing system searches the B-tree, initially searching for a name alphabetically similar to the known file name. As a result of the overall similarity preserved between the names by the file name generation processes which produce the corresponding file names, a wildcard search allowing certain characters to vary is highly likely to produce a match. In step 1006, a wildcard is generated in which the characters in the name most likely to be changed in the generation process may vary (for example, "filena??.exe" would be generated for known file name "filenameofgreatlength.exe"). In step 1008, the wildcard is enumerated into all possible file names potentially described and entries for these file names are located. For example, "filena??.exe" would be enumerated into existing file names such as "filename.exe", "filena-1.exe", "filena-2.exe" etc. If the corresponding file name with a matching file pointer is found in step 1010, then the conversion process ends and the corresponding file name is returned. For example, filenameofgreatlength.exe is converted to filena-1.exe because its entry points to the same file and filena-1.exe is returned as the corresponding file name.

If, in step 1010, a matching file pointer is not found in any of the entries containing the wildcard enumerations, then the B-tree is searched based on an enumeration of a random wildcard "*.*" in steps 1012 and 1014, and the corresponding file name having a matching file pointer is returned.

Thus, if the short name entry and long name entry are not located in the same leaf node, one can be converted to the other by searching the entire tree with a wildcard, instead of just searching a leaf node. Such would be the case in the unlikely event that a file name is located on a different side of a key than the file name from which it is generated. For example, if filenameofgreatlength.exe and filena-2.exe pointed to the same file, and filena-1.exe were a key in the B-tree, then filenameofgreatlength.exe and filena-2.exe, as a result of being alphabetically divided about "filena-1.exe.", would be divided into separate leaf nodes. Thus, a B-tree-wide search of the wildcard "filena??.exe" would be necessary to return the entry with the address pointer to the same file as the entry for the known filename.

FILE NAME GENERATION

In the preferred embodiment of the present invention, the file name generation process represented by box 200 in FIG. 2 can be applied to generate an application formatted file name (short name) based on a known operation system formatted file name (long name), or vice versa. Although short names are limited to "8.3" format as explained in more detail below, long names can be any length up to 255 characters, and are not restricted by the same rules regarding illegal characters, etc.

Figure 3:
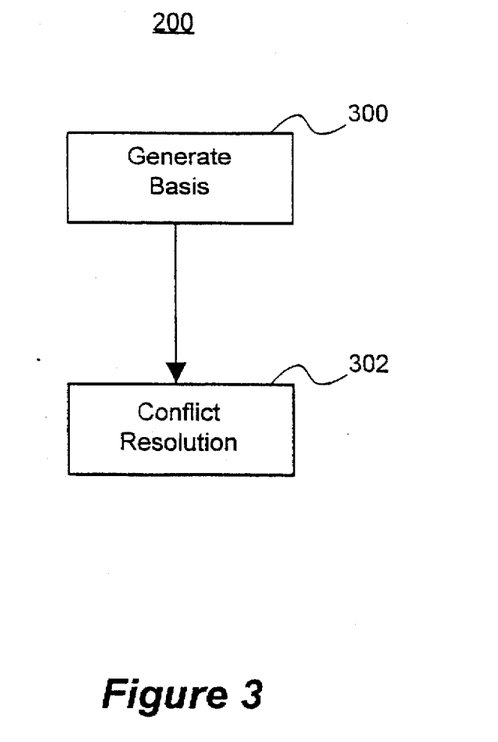
FIG. 3 is a general flow diagram of the generating step 200 shown in FIG. 2.

FIG. 3 is a general flow diagram of the generating block 200 by which the file name of a different format is generated. Regardless of whether a short name is generated from a long name or vice versa, the generation process can be separated into two general parts. First, in step 300, the newly created file name is used to create a basis for a file name of the different format. As will be described in more detail, this involves altering the newly created name to conform to the restrictions imposed by the different name format.

In step 302, the basis created in step 300 is modified as necessary to prevent a replication of an existing file name. When the basis coincides with an existing file name, the basis is modified until a unique file name is derived.

Figure 4:
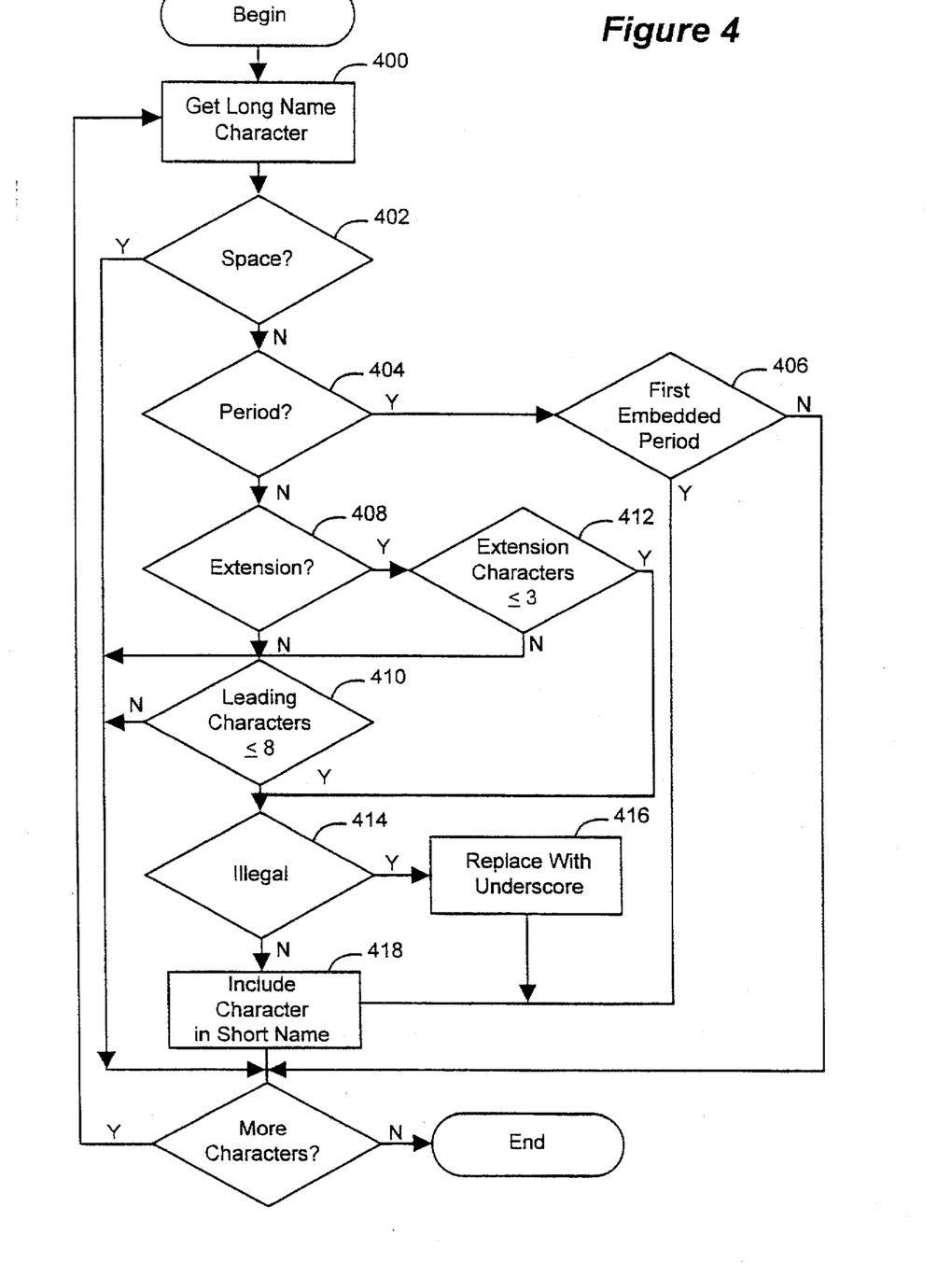
FIG. 4 is a detailed flow diagram of the basis generation step 300 in FIG. 3 as implemented to generate an application formatted file name based on a newly created operating system formatted file name.

FIG. 4 is a detailed flow diagram of the basis generation step 300 in FIG. 3 as implemented to generate a short name based on a newly created long name. This generation process generates an "8.3" DOS formatted file name based on the following rules.

1. Spaces are not allowed within the file name.
2. Only one embedded period is allowed within the file name. That is, initial periods, trailing periods, and multiple periods are not allowed.
3. The characters ":", "+", ",", ";", "=", "[" and "]" are illegal and are not allowed within the file name.
4. Where a period is embedded within the file name, the "leading name" before the period is limited to eight characters and the "extension" after the period is limited to three characters.

Based on these rules, the operating system format to application format generation process performs the following modifications.

1. Spaces are removed. For example, "My File" becomes "Myfile".
2. All but the first embedded period are removed. For example, ".logon" becomes "logon", "backup.c.o" becomes "backup.co", and "main." becomes "main".
3. All illegal characters are translated to an underscore "_".
4. The leading name is truncated to eight characters and any extension is truncated to three characters.

In the flow diagram in FIG. 4, in step 400, a character from the long name is retrieved, beginning with the first character. If, in step 402, the character is a space, the character does not become a character in the application formatted file name.

In step 404, if the character is a period, additional testing is performed. If, in step 406, the period is the first embedded period in the long name, it becomes a character in the short name. If the period is not the first embedded period encountered in the long name, then the period does not become a character in the short name. For example, if the period is at the very beginning or very end of the long name, or if it is the second, third, etc. period in the long name, it does not become a character in the short name. Once the first embedded period is encountered, a flag is set to indicate that following characters are in the extension portion of the file name.

In step 408, it is first determined whether the current character is part of the extension of the file name. If the extension flag has not been set (indicating that the first embedded period has not yet been encountered) then in step 410 it is determined whether the character is still within the first eight leading characters. If so, testing continues. If not, the character is not included and the next character is read in.

If the extension flag has been set (indicating encounter of the first embedded period), then in step 412 it is determined whether the current character is within the first three extension characters. If so, testing continues. If not, the character is not included and the next character is read in.

In step 414, if the character falls within the set of illegal DOS characters, an underscore character is substituted for the illegal character in step 416 and the underscore becomes a character in the short name. Otherwise, the character is maintained "as is" and becomes a character in the short name.

In step 418, characters to be included are included in the short name. To reach step 418, a character must have not violated any of the rules required of characters within DOS names, or must have been changed to conform to these rules, as explained above. In step 420, steps 400–418 are repeated as long as additional characters are present in the long name.

The long name to short name generation process illustrated in FIG. 4 is more specifically defined by the following pseudocode:

```
newperiod = false
leading count = 0
extensioncount = 0
extension = false
illegal = {":", "+", ",", ";", "[", "]"}
while charactersinname
    if newperiod
        addcharacter
        newperiod = false
    get character
    if character <> " "
        if character <> "."
            if extension
                if extensioncount < = 3
                    addcharacter
                    extensioncount = extensioncount + 1
                else if leading count < = 8
                    addcharacter
                    leadingcount = leadingcount + 1
            else if leadingcount < > 0 and not extension
                newperiod = true
                extension = true
```

```
            addcharacter
                if character = illegal
                    character = "_"
                include character
```

Figure 5:
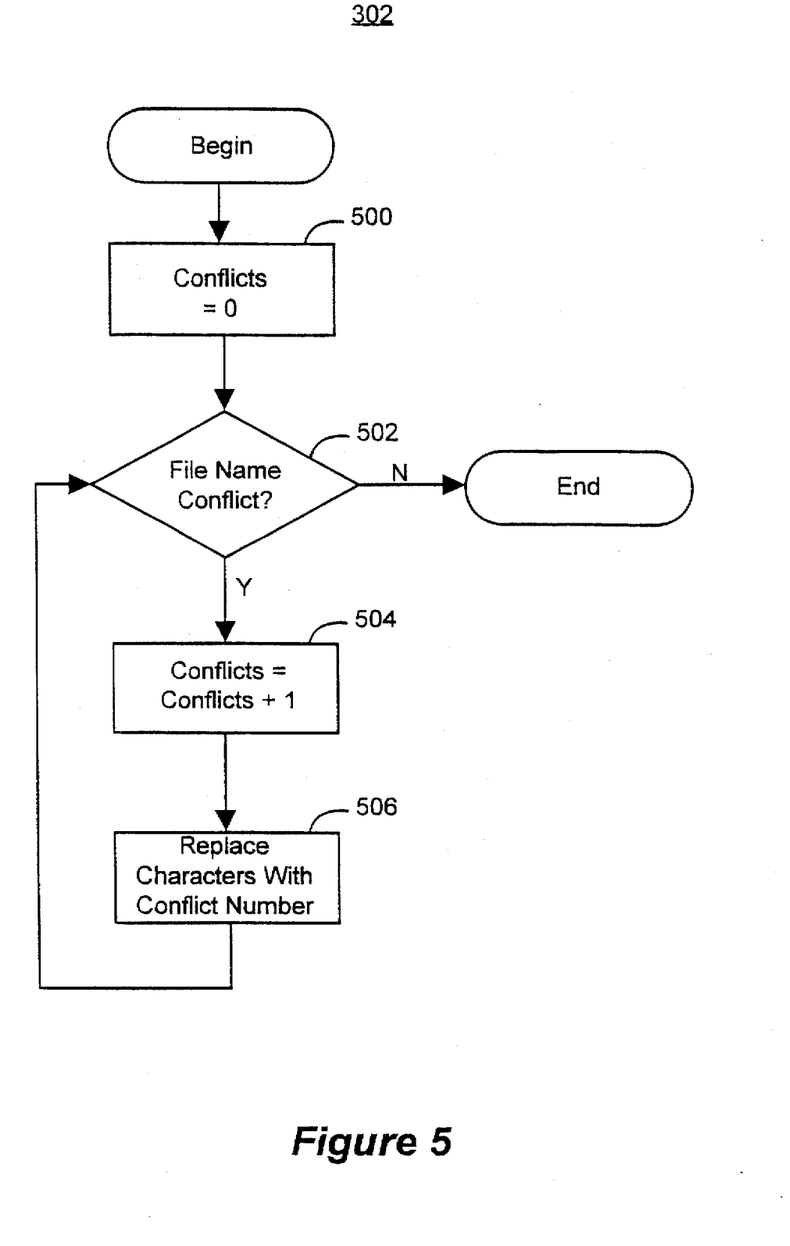
FIG. 5 is a detailed flow diagram of the conflict resolution step in FIG. 3 as applied to an application formatted file name basis that has been generated from an operating system formatted file name.

FIG. 5 is a detailed flow diagram of the conflict resolution step 302 in FIG. 3 as applied to a short name basis that has been generated from a long name. In step 500, the number of conflicts with other file names is initially set to 0. If, in step 502, no other files exist in the B-tree for which all characters are the same as the file name basis, the process ends and the basis becomes the short name. If, however, all of the characters match an existing file name, then control proceeds to step 504, where the number of conflicts is incremented. In step 506, the last characters of the leading name are replaced with a dash "-" followed by a character or characters indicating the number of conflicts thus encountered. For example, when the first conflict has been encountered for filename "SKIPFILE.EXE", then the file name is changed to "SKIPFI-1".EXE. Control then returns to step 502, where the newly modified file name is again compared to existing file names, and steps 502–506 are repeated as long as a conflict exists. When a unique name has been derived, the process ends and the modified file name becomes the short name.

The conflict resolution process shown in FIG. 5 can be performed, for example, as illustrated by the following pseudocode.

```
conflicts = 0
while all characters match
    conflicts = conflicts + 1
    if conflicts < 10
        name (7) = "-"
        name (8) = char (conflicts)
    if conflicts < 100
        name (6) = "-"
        name (7,8) = char (conflicts)
    if conflicts < 1000
    .
    .
    .
```

It should be noted from the above explanation that, to the extent possible within DOS "8.3" format file name constraints, the file name extension in the operating system formatted file name is preserved in generating the application formatted file name. As a result, files of a particular file type (and thus meant to be treated a particular way) will be so treated regardless of the format with which they are referenced. For example, filenameofgreatlength.exe would be converted to filena-1.exe, such that either name denotes the file type as an executable file.

Figure 6:
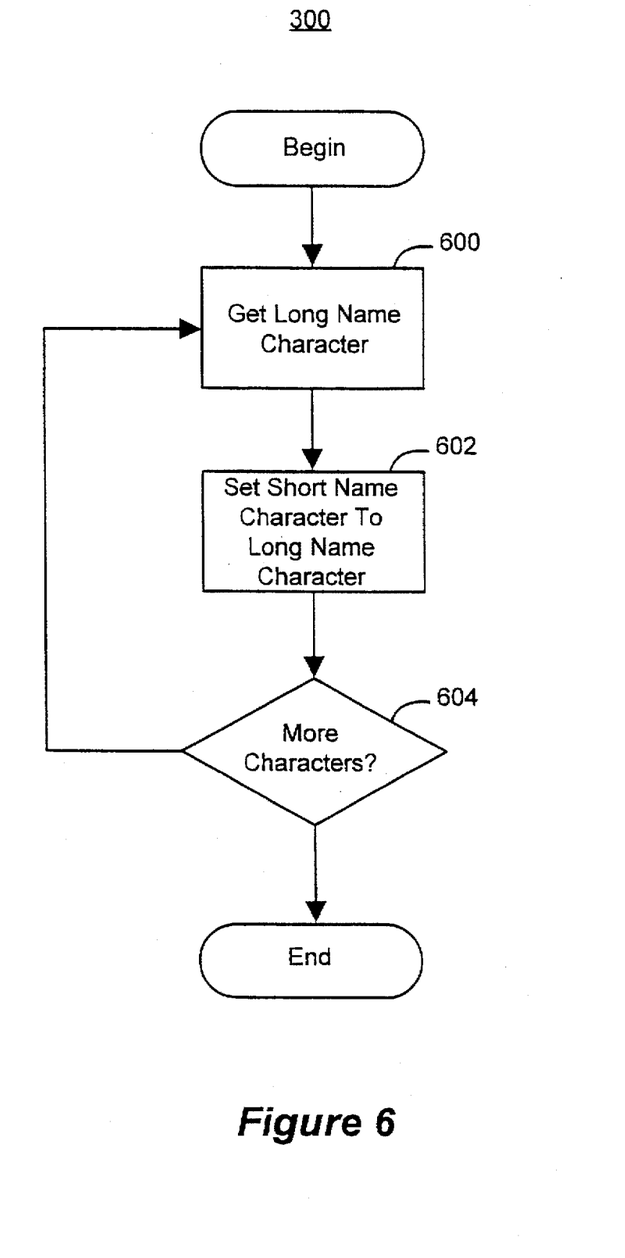
FIG. 6 is a detailed flow diagram of the basis generation step in FIG. 3 as performed to generate an operating system formatted file name basis from an application formatted file name newly created by the user.

FIG. 6 is a detailed flow diagram of the basis generation step 300 in FIG. 3 as performed to generate a long name based on a newly created short name. In generating a long name from a short name, any sequence of characters in the short name will be legal in the long name. Thus, the short name is initially copied to become the basis for the long name. In step 600, a character, initially the first character, is obtained from the application formatted file name. In step 602, the character becomes a corresponding character in the long name basis. In step 604, step 600 and 602 are repeated as long as characters exist in the newly created short name. As a result, the newly crated short name becomes the long name basis.

Figure 7:
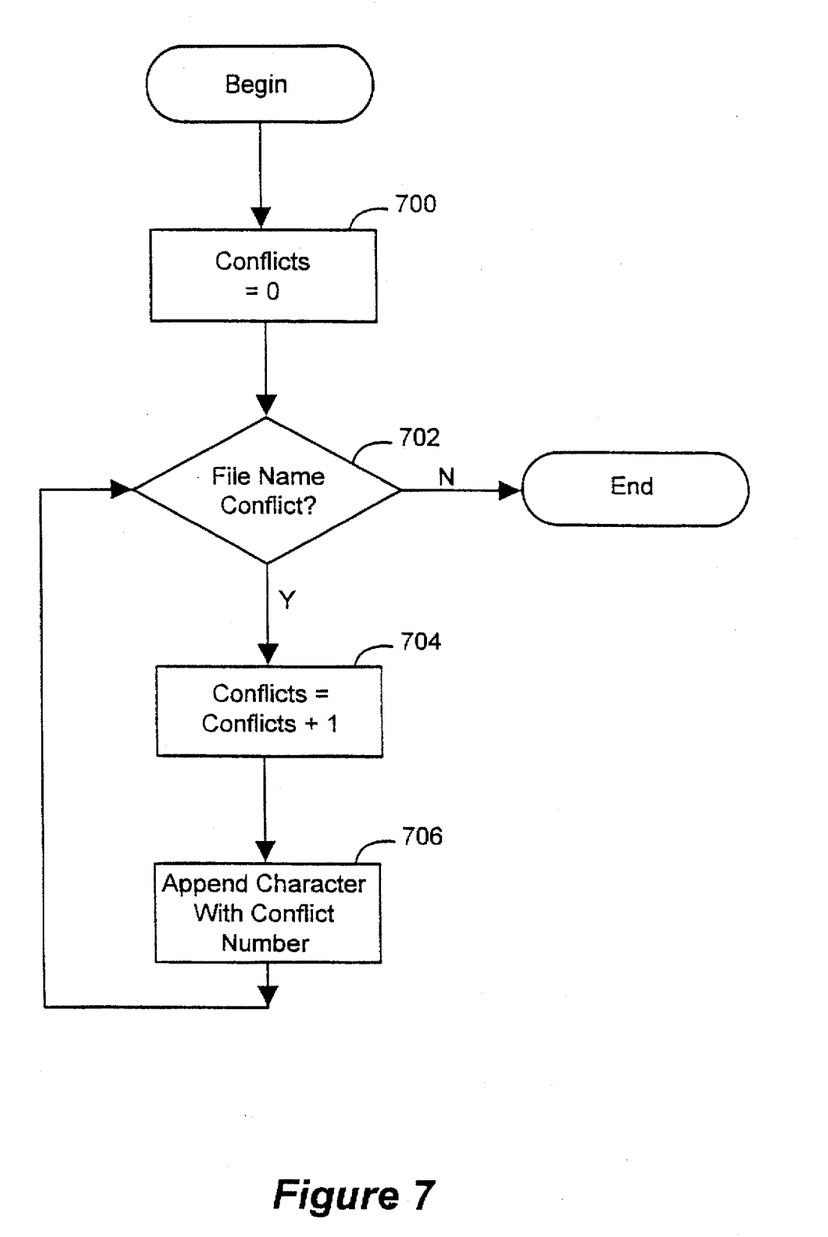
FIG. 7 is a detailed flow diagram of the conflict resolution step 302 shown in FIG. 3 as applied to an operating system formatted file name basis generated from a user created application formatted file name.

FIG. 7 is a detailed flow diagram of the conflict resolution step 302 shown in FIG. 3 as applied to a long name basis that has been generated from a user created short name. This process is similar to the conflict resolution of a short name basis generated from a long name. Because of the more flexible format of long names, however, the conflict number can be appended to the leading name instead of replacing its final characters.

In step 700, the number of conflicts with existing file names is initially set to 0. If, in step 702, no files exist for which all characters match the file name basis, then the process ends and the file name basis becomes the long name. If, however, a conflict is determined in step 702, control proceeds to step 704, where the number of conflicts is incremented, and in step 706, the leading name is appended with a dash "-" and a character or characters indicating the number of conflicts determined thus far. For example, when a first conflict has been encountered for filename "SKIPFILE.EXE" then the file name is changed to "SKIPFILE-1.EXE". It should be noted that, unlike the short name basis in which characters must be sometimes replaced, the long name basis may simply be appended because of the greater allowed length of the name. Control then returns to step 702, and step 704 and 706 are repeated as long as file names exist which conflict with the file name basis created. When a unique file name is derived, it becomes the long name.

The conflict resolution step shown in FIG. 7 can be performed, for example, as illustrated by the following pseudocode.

```
conflicts = 0
while all characters match
    conflicts = conflicts + 1
    name (9) = "-"
    name (10, 11,...) = char (conflicts)
```

It should be noted from the above explanation that the file name extension in the application formatted file name (short name) is entirely preserved in generating the operating system formatted file name (long name). As a result, files meant to be treated a particular way and designated as such by the extension, such as ".EXE" files, will be so treated regardless of the format with which they are referenced.

As a result of providing the multiple file name referencing system described above, either file name can be used to accurately and directly reference a file without requiring additional file name translation.

Although the present invention has been described in terms of the above-preferred embodiment, the invention itself is not limited to the embodiment described. Implementations and modifications within the spirit of the invention will be apparent to those of ordinary skill in the art. The scope of the invention itself is defined in the following claims.

We claim:

1. A method in a computer system for accessing a file using a tree structure, the computer system having a memory, the tree structure having a plurality of file entries, each file entry for storing a file name identifying a file and a file storage indicator indicating a location of the file in the memory, the file name being either a long file name in a long file name format or a short file name in a short file name format, the method comprising:

when creating a file,
receiving a long file name in a long file name format;
storing the received long file name in a first file entry of the tree structure along with a file storage indicator indicating the location of the file in the memory;
automatically generating a short file name in a short file name format; and
storing the generated short file name in a second file entry of the tree structure along with the file storage indicator indicating the location of the file in the memory, the second file entry being different from the first file entry; and when accessing the file,
upon receiving the long file name,
locating the first file entry in the tree structure in which the received long file name is stored;
retrieving the file storage indicator stored in the located first file entry; and
accessing the file in the memory using the retrieved file storage indicator; and
upon receiving the short file name,
locating the second file entry in the tree structure in which the received short file name is stored;
retrieving the file storage indicator stored in the located second file entry; and
accessing the file in the memory using the retrieved file storage indicator.

2. The method of claim 1 wherein automatically generating the short file name comprises deriving the short file name from the long file name.

3. The method of claim 1 wherein automatically generating the short file name includes modifying the short file name upon a conflict with an existing file name.

4. The method of claim 1, further comprising, after creating the file, retrieving the short file name when provided with the long file name.

5. The method of claim 4 wherein retrieving the short file name when provided with the long file name includes locating in the tree structure an entry containing the provided long file name, retrieving the file storage indicator in the located entry, locating in the tree structure another entry containing the retrieved file storage indicator, and retrieving the short file name from the located other entry.

6. The method of claim 1, further comprising, after creating the file, retrieving the long file name when provided with the short file name.

7. The method of claim 6 wherein retrieving the long file name when provided with the short file name includes locating in the tree structure an entry containing the provided short file name, retrieving the file storage indicator in the located entry, locating in the tree structure another entry containing the retrieved file storage indicator, and retrieving the long file name from the located other entry.

8. A method in a computer system for accessing a file using a tree structure, the computer system having a memory, the tree structure having a plurality of file entries, each file entry for storing a file name identifying a file and a file storage indicator indicating a location of the file in the memory, the file name being either a long file name in a long file name format or a short file name in a short file name format, the method comprising:

when creating a file,
receiving a long file name in a long file name format;
storing the received long file name in a first file entry of the tree structure along with a file storage indicator indicating the location of the file in the memory;
automatically generating a short file name in a short file name format; and
storing the generated short file name in a second file entry of the tree structure along with the file storage indicator indicating the location of the file in the memory, the second file entry being different from the first file entry, whereby the file can be accessed using either file name by locating in the tree structure the file entry corresponding to the file name.

9. The method of claim 8 wherein automatically generating the short file name comprises deriving the short file name from the long file name.

10. The method of claim 8 wherein automatically generating the short file name includes modifying the short file name upon a conflict with an existing file name.

11. The method of claim 8, further comprising retrieving the short file name when provided with the long file name.

12. The method of claim 11 wherein retrieving the short file name when provided with the long file name includes locating in the tree structure an entry containing the provided long file name, retrieving the file storage indicator stored in the located entry, locating in the tree structure another entry containing the retrieved file storage indicator, and retrieving the short file name from the located other entry.

13. A method in a computer system for accessing a file using a tree structure, the computer system having a memory, the tree structure having a plurality of file entries, each file entry for storing a file name identifying a file and a file storage indicator indicating a location of the file in the memory, the tree structure including a long file name in a long file name format identifying the file to be accessed and a short file name in a short file name format identifying the file to be accessed, the method comprising:

upon receiving a request to access the file with a requested file name,
locating the file entry in the tree structure in which the requested file name is stored, wherein the requested file name can be either the short file name or the long file name;
retrieving the file storage indicator stored in the located file entry; and
accessing the file in the memory using the retrieved file storage indicator.

14. The method of claim 13, further comprising:
receiving a request to retrieve the short file name when provided with the long file name; and
retrieving the requested short file name when provided with the long file name.

15. The method of claim 14 wherein retrieving the requested short file name when provided with the long file name includes locating in the tree structure an entry containing the provided long file name, retrieving the file storage indicator stored in the located entry, locating in the tree structure another entry containing the retrieved file storage indicator, and retrieving the requested short file name from the located other entry.

16. A computer system for accessing a file using a B-tree, the computer system having a memory, the B-tree having a plurality of file entries, each file entry for storing a file name identifying a file and a file storage indicator indicating a location of the file in the memory, the file name being either a long file name in a long file name format or a short file name in a short file name format, the computer system comprising:

means, when creating a file, for:
receiving a long file name in a long file name format;
storing the received long file name in a first file entry of the B-tree along with a file storage indicator indicating the location of the file in the memory;
automatically generating a short file name in a short file name format; and
storing the generated short file name in a second file entry of the B-tree along with the file storage indicator indicating the location of the file in the memory, the second file entry being different from the first file entry; and means, when accessing the file, for:
upon receiving the long file name,
locating the first file entry in the B-tree in which the long file name is stored;
retrieving the file storage indicator stored in the located first file entry; and
accessing the file in the memory using the retrieved file storage indicator; and
upon receiving the short file name,
locating the second file entry in the B-tree in which the short file name is stored;
retrieving the file storage indicator stored in the located second file entry; and
accessing the file in the memory using the retrieved file storage indicator.

17. The computer system of claim 16, further comprising:
means for receiving a request to retrieve the short file name when provided with the long file name; and
in response to the received request, means for locating in the B-tree an entry containing the provided long file name;
means for retrieving the file storage indicator stored in the located entry;
means for locating in the B-tree another entry containing the retrieved file storage indicator; and
means for retrieving the requested short file name from the located other entry.

18. A computer storage medium containing instructions that cause a computer system to:
when creating a file,
receive a first file name in a first file name format;
store the received first file name in a first file entry of a file referencing system along with a file storage indicator indicating the location of the file in a memory, the file referencing system having a plurality of file entries, each file entry for storing a file name identifying a file and a file storage indicator;
automatically generate a second file name in a second file name format; and
store the generated second file name in a second file entry of the file referencing system along with the file storage indicator indicating the location of the file in the memory, the second file entry being different from the first file entry, whereby the file can be accessed using either file name by locating in the file referencing system the file entry corresponding to the file name.

19. The computer storage medium of claim 18 wherein the instructions that cause the computer system to automatically generate the second file name cause the computer system to automatically generate the second file name based on the first file name.

20. The computer storage medium of claim 19 wherein the instructions that cause the computer system to automatically generate the second file name based on the first file name cause the computer system to modify the second file name upon a conflict with an existing file name.

21. The computer storage medium of claim 18 wherein, after the instructions cause the computer system to store the generated second file name, the instructions cause the computer system to:
receive a request to access a file, the request providing a file name; and
in response to the received request,
when the provided file name is the first file name,
locate the file entry in the file referencing system in which the first file name is stored;

retrieve the file storage indicator stored in the located file entry; and access the file in the memory using the retrieved file storage indicator; and when the provided file name is the second file name, locate the file entry in the file referencing system in which the second file name is stored;

retrieve the file storage indicator stored in the located file entry; and access the file in the memory using the retrieved file storage indicator.

22. The computer storage medium of claim 18 wherein, after the instructions cause the computer system to store the generated second file name, the instructions cause the computer system to:

receive a request to retrieve the second file name when provided with the first file name; and in response to the received request, locate in the file referencing system an entry containing the provided first file name;

retrieve the file storage indicator stored in the located entry;

locate in the file referencing system another entry containing the retrieved file storage indicator; and retrieve the requested second file name from the located other entry.

23. A computer storage medium containing instructions that cause a computer system to:

upon receiving a first file name, locate a file entry in a file referencing system in which the first file name is stored, the file referencing system having a plurality of file entries, each file entry for storing a file name identifying a file and a file storage indicator indicating a location of the file, the file referencing system including a first file name in a first file name format identifying the file to be accessed and a second file name in a second file name format identifying the file to be accessed;

retrieve the file storage indicator stored in the located file entry; and access the file in the memory using the retrieved file storage indicator; and upon receiving a second file name, locate the file entry in the file referencing system in which the second file name is stored;

retrieve the file storage indicator stored in the located file entry; and access the file in the memory using the retrieved file storage indicator.

24. The computer storage medium of claim 23 wherein the instructions cause the computer system to:

receive a request to retrieve the second file name when provided with the first file name; and in response to the received request, locate in the file referencing system an entry containing the provided first file name;

retrieve the file storage indicator stored in the located entry;

locate in the file referencing system another entry containing the retrieved file storage indicator; and retrieve the requested second file name from the located other entry.

* * * * *

UNITED STATES PATENT AND TRADEMARK OFFICE
CERTIFICATE OF CORRECTION

PATENT NO. : 5,745,902
DATED : April 28, 1998
INVENTOR(S) : Miller et al.

It is certified that error appears in the above-identified patent and that said Letters Patent is hereby corrected as shown below:

Column 7,
Line 52, "illegal = {":", "+", ",", ";", "[", "]"}" should read -- illegal = {":", "+", ",", ";", "=", "[", "]"} --.

Signed and Sealed this

Twenty-third Day of August, 2005

JON W. DUDAS
*Director of the United States Patent and Trademark Office*